United States Patent Office 3,738,990
Patented June 12, 1973

3,738,990
NICOTINIC ACID DERIVATIVES
Alden Gamaliel Beaman, North Caldwell, and Oscar Neal Miller, Montclair, N.J., assignors to Hoffmann-La Roche Inc., Nutley, N.J.
No Drawing. Filed Nov. 23, 1970, Ser. No. 92,296
Int. Cl. C07d 31/36
U.S. Cl. 260—295.5 R                    2 Claims

ABSTRACT OF THE DISCLOSURE

6 - halo-2-hydroxynicotinic acid, 4-amino-2-hydroxynicotinic acid, 2-hydroxy-4-(lower alkyl)nicotinic acid, 2-hydroxy-5-(lower alkyl)nicotinic acid, 5-halo-2-hydroxynicotinic acid, and their salts, useful as hypolipidemic agents, are described.

BACKGROUND OF THE INVENTION

While it has been known that nicotinic acid is an effective hypolipidemic agent [Miller, O. N. and Hamilton, J. G., in R. Paoletti (editor), Lipid Pharmacology, Academic Press, New York, 1964, p. 276] and is of value in lowering serum cholesterol and lipid levels in man [Parsons, W. B., Circulation 24, 1099 (1961)], it is also known that its use is beset with side effects, such as vasodilation. Such side effects are highly undesirable since hypolipidemic agents under normal conditions are employed over extended periods of time. The compounds of the invention are significantly more effective hypolipidemic agents than nicotinic acid, and therefore can be administered in such doses as to avoid undesirable side effects.

BRIEF SUMMARY OF THE INVENTION

The invention relates to hypolipidemically effective compounds selected from the group consisting of 6-halo-2-hydroxynicotinic acid, 4-amino-2-hydroxynicotinic acid, 2-hydroxy - 4 - (lower alkyl)nicotinic acid, 2-hydroxy-5-(lower alkyl)nicotinic acid and 5-halo-2-hydroxynicotinic acid, and salts thereof formed with pharmaceutically acceptable bases.

DETAILED DESCRIPTION OF THE INVENTION

The invention relates to novel compounds selected from the group consisting of 6-halo-2-hydroxynicotinic acid, 4-amino-2-hydroxynicotinic acid, 2-hydroxy-4-(lower alkyl)nicotinic acid, 2-hydroxy-5-(lower alkyl)nicotinic acid and 5-halo-2-hydroxynicotinic acid, and salts thereof with pharmaceutically acceptable bases.

As used herein, the term "lower alkyl" denotes an alkyl group having from 1-4 carbon atoms; methyl is preferred. The term "halogen" or "halo" denotes chlorine, bromine, fluorine and iodine; chlorine is preferred.

Preferred compounds of the invention are 6-chloro-2-hydroxynicotinic acid and 5-chloro-2-hydroxynicotinic acid.

The compounds of the invention, exemplary of which are 6-chloro-2-hydroxynicotinic acid, 4-amino-2-hydroxynicotinic acid, 2-hydroxy-4-methylnicotinic acid, 2-hydroxy-5-methylnicotinic acid and 5-chloro-2-hydroxynicotinic acid, can be prepared as hereinafter described. For example, a 2-hydroxy-4-(lower alkyl)nicotinic acid can be prepared by treating 4-chloro-2-hydroxynicotinic acid with lower alkyl lithium or lower alkyl magnesium bromide; 4-amino-2-hydroxynicotinic acid can be prepared by treating 2-hydroxy-3-methylpyridine with an oxidizing agent to yield the corresponding N-oxide, treating the N-oxide with nitric acid/sulfuric acid to yield 2-hydroxy-3-methyl-4-nitropyridine N-oxide, oxidizing the latter N-oxide to yield 2-hydroxy-4-nitronicotinic acid N-oxide, and hydrogenating the latter reaction product to yield the desired 4-amino-2-hydroxynicotinic acid; a 6-halo-2-hydroxynicotinic acid can be prepared by treating 2,6-dihalonicotinic acid with a base, for example, an alkali metal hydroxide, such as sodium hydroxide, at the reflux temperature of the reaction mixture, acidifying the reaction mixture with an acid, for example, a hydrohalic acid such as hydrochloric acid, and thereafter, recovering the desired end product; a 2-hydroxy-5-(lower alkyl) nicotinic acid can be prepared by treating 2-hydroxy-3-bromo-5-(lower alkyl)pyridine with n-butyl lithium in an inert solvent, for example, tetrahydrofuran, and recovering the desired end product; and a 5-halo-2-hydroxynicotinic acid can be prepared, for example, by treating 2-hydroxy-5-aminonicotinic acid with sodium nitrite, hydrochloric acid/cuprous chloride or hydrobromic acid/cuprous bromide, preferably at a temperature below 0° C., and thereafter recovering the desired end product.

The invention also relates to the salts of the nicotinic acid derivatives hereinbefore discussed, which can be prepared by reaction with a base having a non-toxic, pharmaceutically acceptable cation. Thus, any base which will form a salt with a carboxylic acid and which will not be toxic or have adverse pharmacological effects can be utilized. Exemplary of such bases are the alkali metal and alkaline earth metal hydroxide carbonates and the like, for instance, sodium hydroxide, potassium hydroxide, calcium hydroxide, calcium carbonates, and the like, ammonia, primary, secondary and tertiary amines, such as mono-, di- or trialkylamines, for instance, methylamine, dimethylamine, trimethylamine, and the like, and nitrogen containing heterocyclic amines, for instance, piperidine and the like.

A respected segment of the scientific community concerned with the problem of atherosclerosis subscribed to the concept that cholesterol and other lipids play a role in the development of atherosclerosis, a fatty degeneration of the inner coat of the arteries; and, since cholesterol and various other lipids are synthesized by various of the body organs, compounds which inhibit the synthesis and/or reduce the serum levels of cholesterol and other lipids are considered to be effective in preventing the development of atherosclerosis. Unexpectedly, it has been discovered that certain derivatives of nicotinic acid, as herein described, are highly effective hypolipidemic agents.

Thus, the compounds of the invention and their salts formed with pharmaceutically acceptable bases can be utilized in the form of pharmaceutical preparations for the treatment and prevention of atherosclerosis.

For such use, the presently disclosed compounds are formulated, using conventional inert pharmaceutical adjuvant materials, into dosage forms which are suitable for oral or parenteral administration. Such dosage forms include tablets, suspensions, solutions, and the like. Furthermore, the compounds of this invention can be incorporated into, and administered in the form of, suitable hard or soft capsules. The identity of the inert adjuvant materials which are used in formulating the present compounds into oral and parenteral dosage forms will be immediately apparent to persons skilled in the art. These adjuvant materials, either inorganic or organic in nature, include for example, water, gelatin, lactose, starch, magnesium stearate, talc, vegetable oils, gums, polyalkylene glycols, and the like. Moreover, preservatives, stabilizers, wetting agents, emulsifying agents, salts for altering osmotic pressure, buffers, and the like, can be incorporated, if desired, into such formulations.

The quantity of active medicament which is present in any of the above-described dosage forms is variable. It is preferred, however, to provide capsules or tablets containing from about 10 mg. to about 100 mg. of a compound of the invention or an equivalent amount of a pharmaceutically acceptable salt thereof formed with a base. For parenteral administration, it is preferred, for example, with 6-chloro-2-hydroxynicotinic acid, to provide a solution containing from about 0.5 mg./ml. to about 5.0 mg./ml. of said compound, or an equivalent amount of a pharmaceutically acceptable salt thereof formed with a base.

The frequency with which any such dosage form will be administered to a warm-blooded animal will vary, depending upon the quantity of active medicament present therein and the needs and requirements of the patient, as diagnosed by the prescriber. Under ordinary circumstances, however, from about 0.25 mg./kg. to about 2.5 mg./kg. of a compound of the invention can be administered daily in divided doses. A suitable regimen, for example, with 6-chloro-2-hydroxynicotinic acid comprises 10 mg. three times a day. It is to be understood, however, that the dosages set forth herein are exemplary only and that they do not, to any extent, limit the scope or practice of this invention.

The following examples further illustrate the invention. All temperatures are in degrees centigrade, unless otherwise mentioned.

EXAMPLE 1

Preparation of 6-chloro-2-hydroxynicotinic acid

A mixture of 6.00 g. of 2,6-dichloronicotinic acid and 78 ml. of 2 N NaOH solution was refluxed for 2 hours, cooled and acidified with 17 ml. of 10 N HCl. The mixture was cooled 30 minutes in an ice bath, and the solid was filtered and washed with water. The solid was slurried in 25 ml. of warm ethanol, filtered and washed with warm ethanol. The ethanol insoluble solid M.P. 296–298° dec. was recrystallized from 1500 ml. of 1:2 vol.:vol. ethanol:water to give 2-chloro-6-hydroxynicotinic acid, having a melting point of 300–302° dec. The ethanol filtrate from the solid, having a melting point of 296–298° dec., was let evaporate to dryness and the solid was slurried in ether, filtered, washed with ether and recrystallized from 20 ml. of ethanol to give 6-chloro-2-hydroxynicotinic acid, having a melting point of 218–220° C. dec.

EXAMPLE 2

Preparation of 2-hydroxy-5-methyl-nicotonic acid

Method A: A solution of 5.0 g. of 2-hydroxy-3-bromo-5-methylpyridine in 75 ml. of tetrahydrofuran plus 50 ml. of ether was added dropwise over 15 minutes to a stirred solution of 5.8 g. of n-butyl-lithium in 50 ml. of tetrahydrofuran plus 70 ml. of pentane. The temperature rose to 40°. The mixture was stirred for 10 minutes, cooled to 20°, and $CO_2$ bubbled in for 10 minutes. The mixture was decomposed with water and dilute hydrochloric acid. The aqueous phase was concentrated to a small volume, chilled and the crude product which formed was crystallized from ethanol to give 2-hydroxy-5-methylnicotinic acid, having a melting point of 270–271° C.

Method B: A mixture of 114 g. of 2-amino-3-bromo-5-methylpyridine, 73 g. of cuprous cyanide and 570 ml. of dimethylformamide was refluxed for 3.5 hours. The hot reaction mixture was poured into 6 l. of water, whereupon a tan solid formed. This was filtered, washed with water, and stirred for 10 minutes with 2 l. of concentrated ammonium hydroxide. The resulting mixture was extracted with 3 l. of chloroform and the $CHCl_3$ evaporated to give 84 g. of solid. This was recrystallized from 1400 ml. of boiling water to give 30 g. of 2-amino-3-cyano-5-methylpyridine, having a melting point of 159–162°. (A second crystallization of a sample raised the melting point to 162–163°.) Thirty grams of 2-amino-3-cyano-5-methylpyridine was dissolved in a warm solution of 700 ml. of water plus 70 ml. of concentrated $H_2SO_4$. Ice was added to bring the volume to 1 l. and the temperature to 30°. With stirring, a solution of 56 g. of $NaNO_2$ in 150 ml. of water was added over a period of 10 minutes and solids were formed. The mixture was stirred for an additional 10 minutes at 30–35°, heated to 70° over 15 minutes, and cooled thoroughly in an ice bath. The 2-hydroxy-3-cyano-5-methylpyridine was filtered, washed with water and dried; wt. 18.9 g., having a melting point of 231–233°. (Crystallization of a sample from water raised the melting point to 223–235°.) To a suspension of 18.9 g. of 2-hydroxy-3-cyano-5-methylpyridine in 130 ml. of water was added 130 ml. of concentrated $H_2SO_4$ and the resulting solution was refluxed for 2.5 hours. The solution was cooled, treated with concentrated $NH_3$ to pH 3, and thoroughly cooled. The solid was filtered, washed with water, air dried and crystallized from 2.5 l. of boiling ethanol (charcoal) to give colorless platelets of 2-hydroxy-5-methyl-nicotinic acid, having a melting point of 270–271°, having an identical IR spectrum when compared with material made by Method A.

EXAMPLE 3

Preparation of 5-chloro-2-hydroxynicotinic acid

A slurry of 24.7 g. of 2-hydroxy-5-aminonicotinic acid in 111 ml. of concentrated hydrochloric acid was stirred, cooled to −5° and a solution of 16.2 g. of $NaNO_2$ in 40 ml. of water was added dropwise over a period of 15 minutes, maintaining the reaction temperature in the range of −5° to −2°. The slurry was stirred at −5° for a further 15 minutes and was then poured slowly over a period of 10 minutes into a stirred solution of 18,8 g. of cuprous chloride in 100 ml. of concentrated HCl cooled to 5°, maintaining the temperature at 5° to 15°. The slurry was then stirred at room temperature for 2.5 hours, and the solid was filtered, washed with two times 20 ml. of water and then with 20 ml. of ethanol and dried. The crude product was recrystallized first from ethanol and then from water to give yellow needles of 5-chloro-2-hydroxynicotinic acid, having a melting point of 266°–268°.

EXAMPLE 4

Tablet formulation

| | Per tablet, mg. |
|---|---|
| 2-hydroxy-5-methylnicotinic acid | 100 |
| Lactose, USP | 202 |
| Corn starch, USP | 80 |
| Prehydrolyzed corn starch | 20 |
| Calcium stearate | 8 |
| Total weight | 410 |

Procedure:

(1) 2-hydroxy-5-methylnicotinic acid, lactose, corn starch, and prehydrolyzed corn starch are blended in a suitable mixer.
(2) The mixture is granulated to a heavy paste with water and the moist mass is passed through a No. 12 screen, and dried overnight at 110° F.
(3) The dried granules are passed through a No. 16 screen and transferred to a suitable mixer. The calcium stearate is added and mixed until uniform.
(4) The mixture is compressed at a tablet weight of 410 mg. using tablet punches having a diameter of approximately ⅜″. (Tablets may be either flat or biconvex and may be scored if desired.)

EXAMPLE 5

Tablet formulation

| | Per tablet, mg. |
|---|---|
| 6-chloro-2-hydroxynicotinic acid | 10.0 |
| Lactose | 129.0 |
| Corn starch | 50.0 |
| Pregelatinized corn starch | 8.0 |
| Calcium stearate | 3.0 |
| Total weight | 200.0 |

Procedure:

(1) 6-chloro-2-hydroxynicotinic acid, lactose, corn starch and pregelatinized corn starch are mixed in a suitable mixer.
(2) The mix is passed through a Fitzpatrick Comminuting Machine fitted with No. 1A screen, with knives forward.
(3) The mixture is returned to the mixer and moistened with water to a thick paste. The moist mass is passed through a No. 12 screen, and the moist granules are dried on paper-lined trays at 110° F.
(4) The dried granules are returned to the mixer, and the calcium stearate is added and mixed well.
(5) The granules are compressed at a tablet weight of 200 mg. using standard concave punches having a diameter of 5/16".

EXAMPLE 6

Capsule formulation

| | Per capsule, mg. |
|---|---|
| 6-chloro-2-hydroxynicotinic acid | 25.5 |
| Lactose | 159.5 |
| Corn starch | 30.0 |
| Talc | 5.0 |
| Total weight | 220.0 |

Procedure:

(1) 6-chloro-2-hydroxynicotinic acid, lactose and corn starch are mixed in a suitable mixer.
(2) The mixture is passed through a Fitzpatrick Comminuting Machine using a No. 1A screen, with knives forward.
(3) The mixture is returned to the mixer and the talc is added. This mixture is then blended well and filled into No. 4 two-piece, hard gelatin capsules on a capsulating machine.

EXAMPLE 7

Parenteral formulation

Each 1 cc. ampul contains:

| | Per cc. |
|---|---|
| 6-chloro-2-hydroxynicotinic acid | mg.--[1] 5.1 |
| Methyl paraben, USP | mg-- 1.8 |
| Propyl paraben, USP | mg-- 0.2 |

Hydrochloric acid, p.s. pH 4.5.
Water for injection, q.s., add 1 cc.

[1] 2% excess.

Procedure (for 10,000 cc.):

(1) In a clean glass or glass-lined vessel, 8,000 cc. of Water for Injection are heated to 90° C., then cooled to 50–60° C. 18 grams of methyl paraben and 2 grams of propyl paraben are added and dissolved with stirring. The solution is then allowed to cool to room temperature.
(2) The 51.0 grams of 6-chloro-2-hydroxynicotinic acid are added under an atmosphere of nitrogen and stirred until completely dissolved.
(3) The hydrochloric acid is added as 1 N solution until the pH is adjusted to 4.5 plus or minus 0.2.
(4) Sufficient Water for Injection is added to make a total volume of 10,000 cc.
(5) This solution is filtered through an .02 Selas candle, filled into suitable size ampuls, gassed with nitrogen and sealed. The ampuls are autoclaved at 10 lbs. p.s.i. for 30 minutes.

We claim:
1. A compound selected from the group consisting of 6-halo-2-hydroxynicotinic acid, and salts thereof formed with pharmaceutically acceptable bases.
2. A compound in accordance with claim 1, 6-chloro-2-hydroxynicotinic acid.

References Cited

Spath et al., Chem. Abstracts, vol. 18, p. 1500 (1924).
Dornow et al., Chem. Abstracts, vol. 45, 9052 (1951).
Kochetkov et al., Chem. Abstracts, vol. 47, 3309 (1953).
Dornow et al., Chem. Abstracts, vol. 52, 2016g to 2017d (1958).
Guarneri et al., Chem. Abstracts, vol. 56, 12,847i to 12,849d (1962).

ALAN L. ROTMAN, Primary Examiner

U.S. Cl. X.R.
424—266